US007314296B2

(12) United States Patent
Machi et al.

(10) Patent No.: US 7,314,296 B2
(45) Date of Patent: Jan. 1, 2008

(54) MULTI-PLATFORM AIRCRAFT FORWARD POSITION LIGHT UTILIZING LED-BASED LIGHT SOURCE

(75) Inventors: Nicolo F. Machi, Marysville, OH (US); Jeffrey M. Singer, Fairborn, OH (US); Mark A. McKenzie, Delaware, OH (US)

(73) Assignee: Honeywell International Inc., Morristownship, NJ (US)

( * ) Notice: Subject to any disclaimer, the term of this patent is extended or adjusted under 35 U.S.C. 154(b) by 0 days.

(21) Appl. No.: 10/811,684

(22) Filed: Mar. 29, 2004

(65) Prior Publication Data

US 2005/0122727 A1    Jun. 9, 2005

Related U.S. Application Data

(60) Provisional application No. 60/527,299, filed on Dec. 8, 2003.

(51) Int. Cl.
*F21V 21/00* (2006.01)

(52) U.S. Cl. ............. 362/470; 362/800; 362/545; 340/815.45

(58) Field of Classification Search ............. 340/815.45; 362/800, 545, 184, 294
See application file for complete search history.

(56) References Cited

U.S. PATENT DOCUMENTS

| 4,663,627 | A | 5/1987 | Dennis |
| 6,354,714 | B1 | 3/2002 | Rhodes |
| 6,461,029 | B2 * | 10/2002 | Gronemeier et al. ........ 362/545 |
| 6,462,669 | B1 * | 10/2002 | Pederson ................ 340/815.45 |
| 6,483,439 | B1 | 11/2002 | Vukosic |
| 6,507,290 | B1 * | 1/2003 | Lodhie et al. ............... 340/981 |
| 6,559,777 | B1 | 5/2003 | Martin et al. |
| 6,568,833 | B2 * | 5/2003 | Worgan et al. ............. 362/247 |
| 6,578,986 | B2 * | 6/2003 | Swaris et al. ............... 362/249 |
| 6,598,998 | B2 * | 7/2003 | West et al. .................. 362/307 |

(Continued)

FOREIGN PATENT DOCUMENTS

| EP | 1 168 902 A2 | 1/2002 |
| WO | WO 03/068599 A1 | 8/2003 |

OTHER PUBLICATIONS

Honeywell: "Introducing Honeywell Astreon Solid State Lighting for Business Aircraft" 'Online! (Oct. 2003) XP002322009.

*Primary Examiner*—Sandra O'Shea
*Assistant Examiner*—Anabel Ton
(74) *Attorney, Agent, or Firm*—Birch, Stewart, Kolasch & Birch, LLP

(57) ABSTRACT

An aircraft forward position lighting device (1) has a modular configuration, including a mounting module (20) containing solid-state light sources, e.g., light-emitting diodes (LEDs) (210, 230). The mounting module also includes reflectors 220. The pattern of light emanating from the light sources and reflectors satisfy Federal Aviation Regulations (FARs) regarding minimum light intensity. The device includes a cut-off shield module (10) configured to provide angular cut-offs to the pattern of light, so that the device satisfies FARs regarding overlap between position lights. The device may also include a base assembly module (30) that contains electronic circuitry connecting the light sources to a power source in the aircraft. Electronic updates may be performed by replacing the base assembly module.

24 Claims, 5 Drawing Sheets

U.S. PATENT DOCUMENTS

| | | |
|---|---|---|
| 6,641,284 B2 | 11/2003 | Stopa et al. |
| 6,669,357 B2 * | 12/2003 | Konicke et al. ............ 362/470 |
| 6,674,096 B2 * | 1/2004 | Sommers ..................... 257/98 |
| 6,679,621 B2 * | 1/2004 | West et al. ................. 362/327 |
| 6,799,870 B2 | 10/2004 | Lin |
| 6,866,394 B1 * | 3/2005 | Hutchins et al. ............ 362/192 |
| 6,964,507 B2 | 11/2005 | Mohacsi |
| 6,994,459 B2 | 2/2006 | Worsdell et al. |
| 7,021,801 B2 | 4/2006 | Mohacsi |
| 2002/0018009 A1 | 2/2002 | Rast |
| 2002/0048174 A1 | 4/2002 | Pederson |
| 2002/0196637 A1 | 12/2002 | Dubin et al. |
| 2003/0048641 A1 * | 3/2003 | Alexanderson et al. ..... 362/470 |
| 2003/0107885 A1 | 6/2003 | Galli |
| 2003/0174499 A1 | 9/2003 | Bohlander |
| 2004/0208018 A1 | 10/2004 | Sayers et al. |
| 2005/0068777 A1 | 3/2005 | Popovic |
| 2005/0093718 A1 | 5/2005 | Martin |
| 2005/0110649 A1 * | 5/2005 | Fredericks et al. .... 340/815.45 |
| 2005/0111220 A1 * | 5/2005 | Smith ......................... 362/235 |
| 2005/0128759 A1 * | 6/2005 | Fredericks et al. ......... 362/470 |

* cited by examiner

MULTI-PLATFORM AIRCRAFT FORWARD POSITION LIGHT UTILIZING LED-BASED LIGHT SOURCE

FIELD OF THE INVENTION

The present application claims the benefit of U.S. Provisional Patent Application No. 60/527,299 filed Dec. 8, 2003, the entire contents of which are hereby incorporated by reference.

The present invention is directed to position lighting systems on aircraft, and more particularly to forward position lights utilizing solid-state light sources.

BACKGROUND OF THE INVENTION

In order to prevent collisions with other aircraft, a variety of lights are mounted on the exterior of an aircraft in order to indicate its relative position to the other aircraft in the same general airspace. Such lighting systems include a forward position lighting system comprised of a red light mounted on the port wing and a green light on the starboard wing. Based on the color and movement of the forward position lights on an observed aircraft, the relative position and direction of travel of the aircraft is discernable by other aircraft operating in the same vicinity.

Federal Aviation Regulations (FARs) specify minimum and maximum light intensities for each of the red and green forward position lights as a function of the angle of emission. The limitations for maximum intensities, known as "angular cut-offs," are necessary to prevent excess overlap between these position lights so that other aircraft in the same general airspace can accurately discern between the individual position lights of an aircraft. This assists the other aircraft in determining the relative position of the lighted aircraft. Traditionally, forward position lighting systems have utilized incandescent lamps as a light source. These systems suffer from several disadvantages. Due to their principles of operation, incandescent lamps have a limited life compared to other light sources (e.g., fluorescent, solid-state, and high intensity discharge lights). The harsh environment under which an aircraft operates can further reduce the life of incandescent lamps. Since aviation safety regulations require that the aircraft's position lights be functioning when the aircraft is operating at night, the frequent failures of incandescent positioning lights may result in delayed flight departures as well as high maintenance costs due to replacement.

Furthermore, incandescent-based lighting systems require colored glass filters to achieve the specified colors. Few suppliers worldwide can provide colored glass capable of withstanding the high temperature gradients experienced during operation, while maintaining the FAR-specified colors. Also, this type of glass is very heavy, thereby reducing flight efficiency.

Some existing position lighting systems utilize light emitting diodes (LEDs). However, such systems are not suitable as a direct replacement (either in form or fit) for existing incandescent lights. Thus, some level of "retrofitting" is required in order to install these lights on an aircraft.

In addition, known LED-based position lights have been designed as point solutions—not as a common solution suitable for various platforms. Also, these lighting systems require clusters of LEDs in order to meet the FAR requirements. Another problem associated with known LED-based position lights is the variations in photometric distributions associated with LEDs. Such variations can prevent the position lights from achieving the minimum or maximum intensity distributions required by FARs.

SUMMARY OF THE INVENTION

Exemplary embodiments of the present invention are directed to an aircraft forward position lights that utilize solid-state light sources and are compatible with different mounting platforms.

According to an exemplary embodiment, a forward position light device includes a plurality of modular components. The modular design may facilitate the manufacture and assembly of the forward position light, and allow for easy electronic upgrades.

The modular components of the forward position light device may include a mounting module on which one or more solid-state light sources are mounted. The mounting module may further include a heat sink. The heat sink may be configured to dissipate the heat generated by the solid-state light sources. The heat sink may be incorporated into the casting of the mounting module as cooling fins.

The forward light device may further include a base assembly module, according to an exemplary embodiment. The base assembly module may include electronic circuitry for electrically connecting the solid-state light sources to a power source within the aircraft. The base assembly module may also include a heat sink. This heat sink may comprise cooling fins incorporated into the casting of the base assembly module.

According to an exemplary embodiment, the base assembly module may be interchangeable with other base assembly modules containing different electronic circuitry. Thus, electronic upgrades may be made to the forward position light device by merely replacing the base assembly module. For example, a base assembly module containing passive circuitry may be replaced with one including a current-control device with active components.

In an exemplary embodiment, one or more light emitting diodes (LEDs) are implemented as the light sources on the mounting module. Such LEDs may be configured to emit light at a specific color (aviation red or aviation green) required by Federal Aviation Regulations (FARs) in accordance with the particular position (port or starboard wing) of the forward position light on an aircraft.

According to an exemplary embodiment, side-emitting LEDs may be included in the LEDs of the mounting module. In such an embodiment, the device may further include one or more reflectors whose configuration (e.g., shape and location,) corresponds to the emission characteristics of the side-emitting diodes. In addition, the device may include at least one other type of LED, for instance, a lambertian LED. In an exemplary embodiment, the light emitted by the LEDs combines with the light reflected by the reflectors to form the light pattern emitted by the forward position light. According to an exemplary embodiment, the light pattern complies with the minimum angular intensity requirements imposed by the FARs on forward position lights.

Furthermore, the configuration of LEDs on the mounting module may allow the forward position light device to be installed on a plurality of existing mounting platforms (e.g., those using incandescent position lights), without retrofitting the device or modification. Thus, in an exemplary embodiment, the forward light position light device may be used as a direct replacement of existing incandescent/halogen forward position lights.

In another exemplary embodiment, the forward position light may include a cut-off shield module. The cut-off shield module may incorporate one or more cut-off shields designed to effectively limit the light pattern to satisfy FARs relating to the overlap between position lights.

According to such exemplary embodiments, the LEDs and cut-off shields allow for the forward position light device to comply with FARs without using colored glass.

Further advances in scope of applicability of the present invention will become apparent from the detailed description provided hereinafter. However, it should be understood that the detailed description and specific embodiments therein, while disclosing exemplary embodiments of the invention, are provided by way of illustration only.

BRIEF DESCRIPTION OF THE DRAWINGS

A more complete understanding of the present invention will become apparent from the following description taken in conjunction with the accompanying drawings, wherein.

DETAILED DESCRIPTION OF EXEMPLARY EMBODIMENTS

Figure 1:
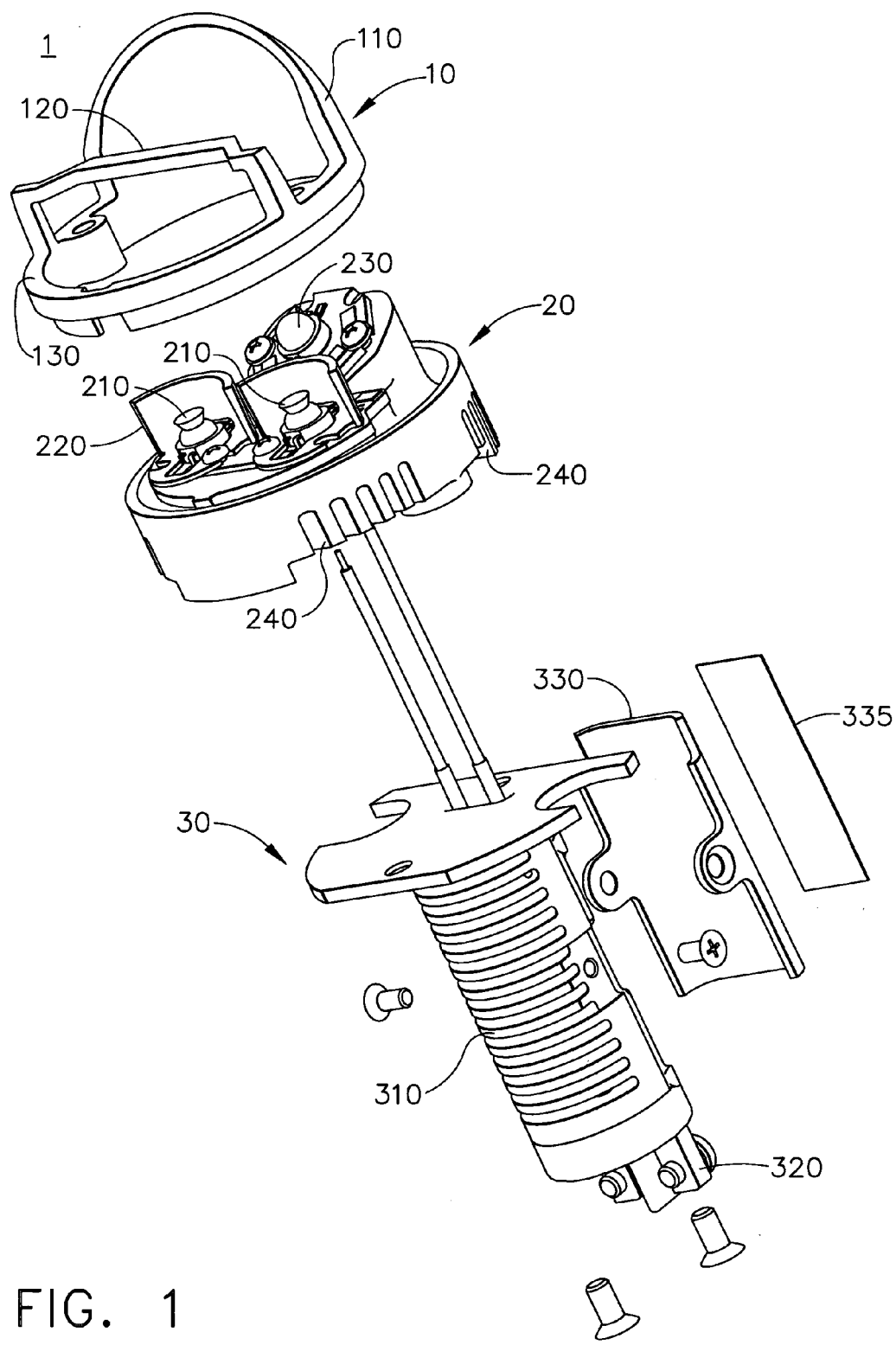
FIG. 1 illustrates an exploded view of a forward position light device, according to an exemplary embodiment of the present invention.

Exemplary embodiments of the present invention are disclosed in the following description.

The present invention is directed to a forward position light device to be mounted on an aircraft (particularly, on a wing of the aircraft) to provide information regarding the aircraft's relative position to other aircraft operating in the same general airspace. According to exemplary embodiments, the position light device utilizes solid state light sources, which have a longer operational life and generate less heat than the incandescent light sources used in conventional forward position lighting systems. In addition, the forward position light device may be portable and capable of being mounted on different types of platforms, in accordance with exemplary embodiments.

Federal Aviation Regulations (FARs)

At this point it may be beneficial to describe some of the requirements imposed on forward position lights by the Federal Aviation Regulations (FARs). It should be noted that the following description is merely provided for illustrative purposes and is not intended to be an exhaustive list of the standards or requirements imposed on forward position lights.

Each forward position light must show unbroken light within a respective range of angles in the horizontal plane (which contains the longitudinal axis of the aircraft and is perpendicular to the aircraft's axis of symmetry).

For example, the forward position light on the port wing (red) must show unbroken light from 0 to 110 deg. to the left of the longitudinal axis of the aircraft, as viewed when looking forward along the longitudinal axis. This angular range, which corresponds to the red forward position light, is known as dihedral angle L.

Conversely, the forward position light on the starboard wing (green) must show unbroken light from 0 to 110 deg. to the right of the longitudinal axis of the aircraft, as viewed when looking forward along the longitudinal axis. This range, which corresponds to the green forward position light, is known as dihedral angle R.

(Dihedral angle A is the angular range corresponding to a rear position light, and spans from 70 deg. to the right of the longitudinal axis to 70 deg. to the left of the longitudinal axis, as viewed when looking aft along the longitudinal axis.)

As mentioned earlier, FARs indicate specific minimum and maximum light intensities for each of the forward position lights (red and green) of an aircraft as a function of the angle of emission. In the horizontal plane, the FARs specify minimum light intensities for the red forward position light within dihedral angle L, and minimum light intensities for the green forward position light in the dihedral angle R. TABLE 1 shows a particular example of these minimum intensities for the horizontal plane, as specified in Part 23, Sec. 23.1391 of the FARs.

TABLE 1

| Angle from right (green) or left (red) of longitudinal axis, measured from dead ahead | Intensity (Candles) |
| --- | --- |
| 0–10 deg. | 40 |
| 10–20 deg. | 30 |
| 20–110 deg. | 5 |

The FARs also specify the minimum intensities in any vertical plane of the forward position lights, as a function of the minimum intensity of the horizontal plane (I) and the angle above or below the horizontal plane. TABLE 2 illustrates these minimum intensities (in terms of I) in this regulation (according to Part 23, Sec. 23.1393, as of the filing date of the present application).

TABLE 2

| Angle above or below the horizontal plane | Intensity |
| --- | --- |
| 0 deg. | 1.00 × I |
| 0–5 deg. | 0.90 × I |
| 5–10 deg. | 0.80 × I |
| 10–15 deg. | 0.70 × I |
| 15–20 deg. | 0.50 × I |
| 20–30 deg. | 0.30 × I |
| 30–40 deg. | 0.10 × I |
| 40–90 deg. | 0.05 × I |

To prevent excessive overlap between the forward position lights, the FARs also specify maximum light intensities in the horizontal plane as a function of the angle of emission. In particular, the FARs define the maximum intensity that the red forward position light may have in certain areas of the adjacent dihedral angle R. Also, the maximum intensity of the green forward position light in certain areas of the adjacent dihedral angle L of the horizontal plane is specified. Furthermore, the FARs specify maximum intensities for both the red and green forward position lights in certain areas of the adjacent dihedral angle A (in order to prevent excessive overlap with the rear position light). TABLE 3 shows a particular example of these maximum intensities, as specified in Sec. 1395, Part 23, of the FARs.

Maximum Intensity (Candles)

TABLE 3

| Overlaps | Area A | Area B |
| --- | --- | --- |
| Green in dihedral angle L | 10 | 1 |
| Red in dihedral angle R | 10 | 1 |
| Green in dihedral angle A | 5 | 1 |
| Red in dihedral angle A | 5 | 1 |

As defined in the FARs, Area A includes all directions in the adjacent dihedral angle that pass through the light source and intersect the common boundary plane at more than 10 deg. but less than 20 deg. Area B includes all directions in the adjacent dihedral angle that pass through the light source and intersect the common boundary plane at more than 20 deg.

Accordingly, the specifications illustrated in Table 3 define angular cut-offs for each forward position light. Beyond these angular cut-offs, the intensity of light emitted by each forward position light must be limited at or below the maximum intensities specified in TABLE 3.

Thus, the FARs specify an angular cut-off for the red forward position light at 10 deg. beyond the dihedral angle L into the adjacent dihedral angles R and A, at which the intensity is limited to 10 candles or less. Another angular cut-off is specified for the red forward position light at 20 deg. beyond dihedral angle L into adjacent dihedral angles R and A, at which the intensity is limited to 1 candle or less.

It should be noted that the parameters in TABLES 1-3 are illustrative of the requirements in Part 23 of the FARs, which pertain to normal, utility, acrobatic, and commuter category airplanes. However, it should be noted that other Parts of the FARs maximum and minimum intensity requirements for other types of aircraft. For example, Part 25 provides the FAR requirements for transport category airplanes, Part 27 provides requirements for normal category rotorcraft, and Part 29 provides the requirements for transport category rotorcraft.

It will be noted that the FARs in these Parts also include other requirements, including the particular wavelength (i.e., color) of light corresponding to each Exemplary Embodiments of the Present Invention FIG. 1 illustrates an exploded view of a forward position light device 1, according to an exemplary embodiment of the present invention. According to an exemplary embodiment, the forward position light device 1 is modular. The modularity of the device 1 facilitates assembly and allows certain upgrades to be made by replacing one or more of the modules. The exploded view of FIG. 1 shows different modules of the position light device 1, including: a cut-off shield module 10, an LED heat sink and mounting module 20, and an electronic heat sink module 30.

According to an exemplary embodiment, the LED heat sink and mounting module 20 (hereafter, also referred to as "mounting module") includes light emitting diodes (LEDs) as light sources.

In particular, FIG. 1 shows an exemplary embodiment in which the mounting module 20 includes a primary LED module and secondary LED module. The primary LED module includes two side-emitting LEDs 210, while the secondary LED module includes a single lambertian LED 230. In the exemplary embodiment of FIG. 1, the primary LED module also contains one or more custom-designed reflective elements 220 (hereafter "reflectors") mounted alongside the side-emitting LED 210.

According to an exemplary embodiment, the LEDs 210 on the primary LED module 24 may comprise LUXEON™ side-emitting LEDs, which are currently on the market. Also, the LED 230 on the secondary LED module 22 may comprise a LUXEON lambertian LED currently available on the market. However, other types of LEDs may be implemented on the primary LED module 24 and secondary LED module 22, as will be contemplated by those of ordinary skill in the art.

As shown in FIG. 1 (and FIG. 3B), the side-emitting LEDs 210 are not necessarily mounted on the same plane as the lambertian LED 230. Instead, the side-emitting LED 210 may be mounted at a different angle and level than the lambertian LED 230.

The side-emitting LEDs 210 are mounted on a surface in the primary LED module, which gives each of them a particular orientation. The orientation of each LED 210 refers to its angle relative to the aircraft's longitudinal axis, as well as its relative position within the forward position device 1. The orientation and light emission characteristics of each side-emitting LED 210 is determinative of the pattern (or distribution) of light which that LED 210 emits from the device 1.

Similarly, the mounting surface of the secondary LED module provides a particular orientation to the lambertian LED 230. The distribution of light emitted by the lambertian LED 230 from the forward position device 1 is similarly dependent on the LED's 230 orientation and the light emission characteristics.

Figure 2A:
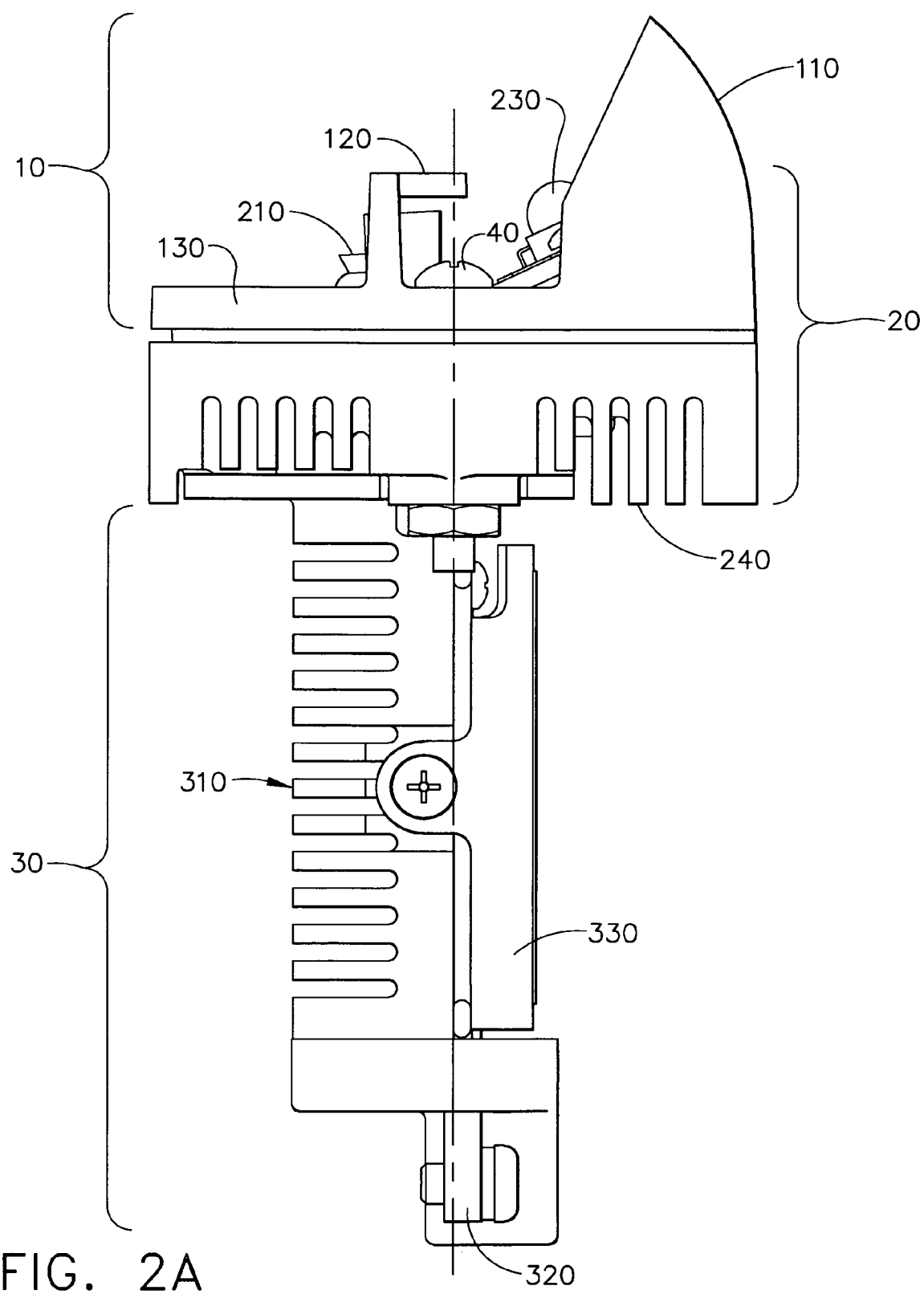
FIGS. 2A and 2B illustrate alternate views of an assembled forward position light device, according to an exemplary embodiment of the present invention.
Figure 3A:
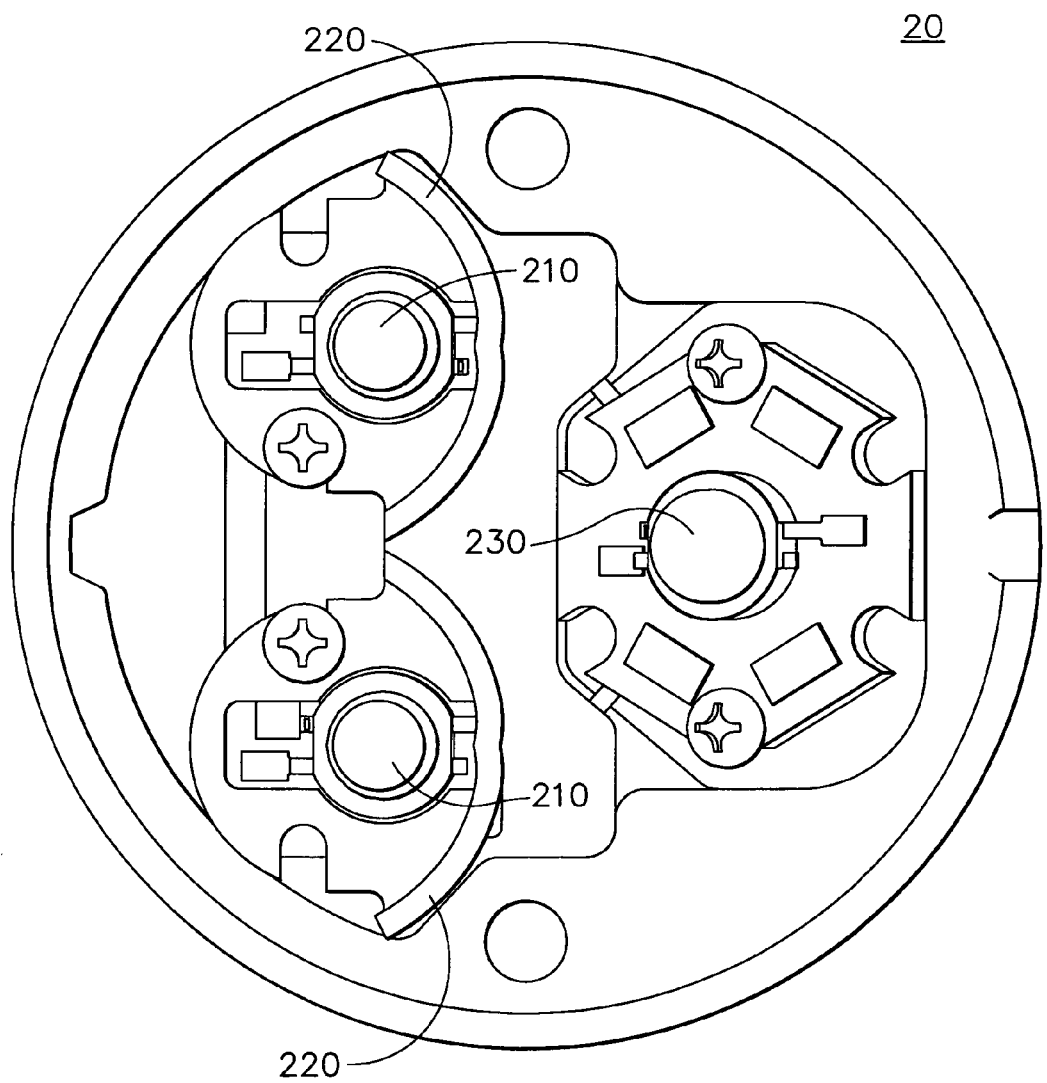
FIGS. 3A and 3B illustrate a cross-section view and perspective view, respectively, of a mounting module containing light-emitting diode (LED) light sources, according to an exemplary embodiment.
Figure 3B:
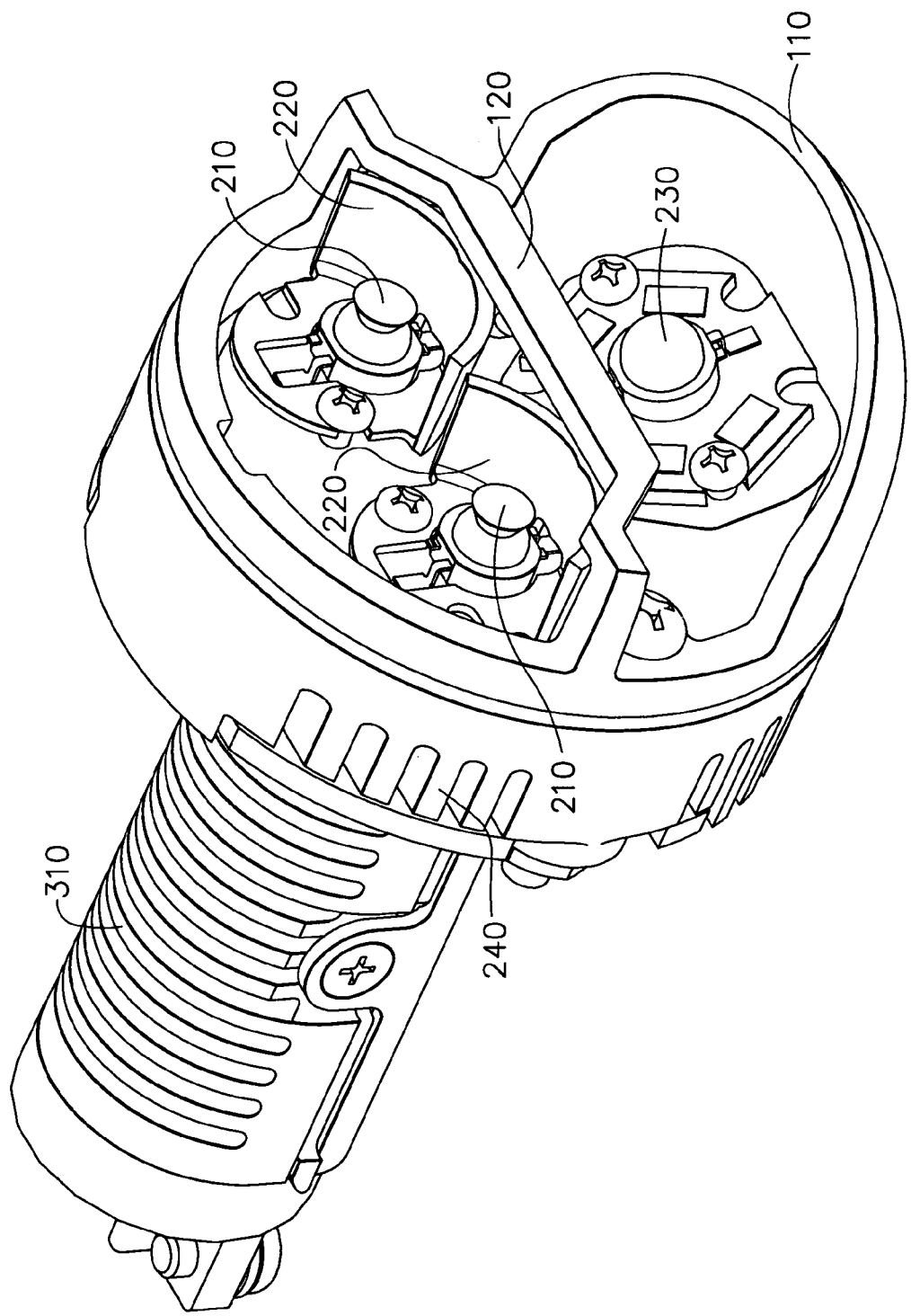

FIGS. 2A, 3A, and 3B provide alternate views of the forward position light device 1. These figures further illustrate the orientations of the various LEDs 210 and 230 in the forward position device, according to exemplary embodiments.

According to an exemplary embodiment, however, the pattern of light emanating from the forward position light device 1 may depend not only on the orientation and light emission characteristics of the LEDs 210 and 230, but also on the reflective qualities of each reflector 220 in the mounting module 20.

In particular, each reflector 220 is configured to reflect light emitted from at least one of the side-emitting LEDs 210. The properties of this reflected light is dependent upon both the light distribution of each side-emitting LED 210 and the configuration of the reflector 220. For purposes of this description, the configuration of each reflector 220 includes (but is not necessarily limited to) the shape, dimensions, type of material, and relative location of the reflector 220 with respect to the corresponding side-emitting LED 210.

Using well-known techniques, those of ordinary skill in the art can configure the reflectors 220 based on the distributions of the side-emitting LEDs 210 so that the reflected light has a desired pattern. For example, such techniques may utilize trial and error, computer simulation, etc. Such techniques for designing the reflectors 220 are readily available to those ordinarily skilled in the art, and do not require undue experimentation to achieve the desired pattern of reflected light.

FIG. 3A illustrates a cross-section view of the mounting module 20, according to such an embodiment. In particular, FIG. 3A illustrates an exemplary configuration of the reflectors 220, in which there is a single reflector 220 for each side-emitting LED 210. As shown in FIG. 3A, the reflective surface of each reflector 220 may be curved. The shape of each reflector 220 may be determined so that the reflectors 220 will reflect light according to the desired pattern described above.

In an alternative exemplary embodiment, a single reflector 220 may be used to produce the desired pattern of reflected light. For example, a single reflector 220 may be designed in a "double-hump" shape, in which the shape of each hump is configured to reflect the light of a corresponding one of the side-emitting LEDs 210.

According to an exemplary embodiment, the configuration of the custom reflectors 220 is designed based on the orientation of the side-emitting LEDs 210 so that the reflected light forms a particular pattern. This pattern may combine with the emissions from the side-emitting LEDs 210 to form a primary distribution of light, i.e., a distribution emanating the primary LED module.

The light emitted by the lambertian LED 230, based on the LED's 230 orientation and emission characteristics, forms a secondary distribution. The secondary distribution of light corresponds to the light produced by the secondary LED module. Techniques for determining an appropriate orientation for the lambertian LED 230, based on the LED's 230 light emission characteristics, are well-known to those of ordinary skill in the art and do not require undue experimentation.

The primary and secondary distributions of light thus combine to form a pattern of light emanating from the forward position light device 1. According to an exemplary embodiment, the primary and secondary LED modules (including the side-emitting LEDs 210, the reflectors 220, and the lambertian LED 230) are configured in such a way that the formed pattern of light satisfies the FARs' requirements regarding minimum light intensities. As described above, it will be readily apparent to those of ordinary skill in the art how to configure the side-emitting LEDs 210 and reflectors 220, along with the lambertian LED 230, so that the pattern of light of the forward position light device satisfies the minimum intensity requirements of the FARs.

According to an exemplary embodiment, the side-emitting LEDs 210 and the lambertian LED 230 are configured to emit light at a color corresponding to the FAR requirements for the particular location of the forward position lighting device 1. In this embodiment, if the forward position lighting device 1 is to be mounted on an aircraft's starboard wing, each of the LEDs 210 and 230 may be configured to emit a green color ("aviation green") that satisfies the FARs. On the other hand, if the position lighting device 1 is to be mounted on the port wing of the aircraft, the LEDs 210 and 230 may be configured to emit a red color ("aviation red") that satisfies the FARs. Side-emitting LEDs and lambertian LEDs configured to emit aviation red and aviation green light may be readily obtained on the market.

Thus, in the above exemplary embodiment, the forward position light device 1 does not require the use of colored class in order to produce light at a particular color to meet the specifications in the FARs.

It should be noted that aviation red and aviation green side-emitting LEDs 210 may exhibit different light emission characteristics, thus causing their respective distributions to be somewhat different. Thus, the configuration of the reflectors 220 for achieving an optimal light pattern may differ a little bit based on whether the forward position light 1 is configured to emit aviation red or aviation green light.

However, according to an exemplary embodiment, the custom reflectors 220 may be designed in order to accommodate either aviation red or aviation green side-emitting LEDs 210. In other words, the design of the reflectors 220 may be a compromise between the optimal designs for red and green side-emitting LEDs 210. However, according an alterative exemplary embodiment, the reflectors 220 may be designed differently based on whether the forward position light device 1 is configured for red or green light, thereby optimizing the light pattern.

As shown in FIGS. 1-2B and 3B, the base of the LED heat sink and mounting module 20 may include one or more sets of cooling fins 240 capable of providing dissipation of the heat generated by the LED modules 22 and 24. Furthermore, this base may be comprised of a heat conducting material that exhibits heat-dissipating properties.

According to an exemplary embodiment, the mounting module 20 may be operably connected to a cut-off shield module 10, which includes one or more cut-off shields.

In an exemplary embodiment shown in FIG. 1, these cut-off shields provide angular cut-offs to the light pattern of the forward position light device 1, thereby preventing the emitted light from excessively overlapping with the other forward position light and the rear position light of the aircraft. In particular, the cut-off shield module 10 may include overlap shields 110 and 120 that prevent the light pattern from exceeding FAR-specified maximum light intensities in the Areas A and B, which overlap with the light pattern of the other forward position light. The cut-off shield module 10 may also include a perimeter shield 130 that prevents the light pattern from exceeding the maximum intensity in Areas A and B, which overlap with the rear position light (corresponding to dihedral angle A).

According to an exemplary embodiment, the cut-off shield module 10 may comprise a single casting made of an optically opaque polymer, which operably connects to the mounting module 20 during operation. Alternatively, the casting may be constructed of other suitable types of materials known within the art. In an exemplary embodiment, the cut-off shields 110, 120, and 130 may be incorporated into the casting.

As shown in FIG. 1, the cut-off shield module 10 may include a large overlap shield 110 that provides an angular cut-off to the secondary distribution of light (i.e., the distribution emitted from the lambertian LED 230). The cut-off shield module 10 may further include an auxiliary overlap shield 120 provides an angular cut-off to the primary distribution of light (i.e., the light emanating from the side-emitting LEDs 210 and the reflectors 220).

Those of ordinary skill in the art will be readily able to design the large overlap shield 110 and auxiliary overlap shield 120, using well-known techniques and without undue experimentation, to effectively cut-off the light pattern from Areas A and B corresponding to the pattern of the other forward position light. Such techniques may include trial and error, computer simulation, or other methods readily apparent to those ordinarily skilled in the art.

It should be noted that the configuration of the large and auxiliary overlap shields 110 and 120 shown in FIGS. 1, 2A, 2B, and 3B are merely illustrative. For example, these figures show the large overlap shield 110 as having a cup shape, and the auxiliary overlap shield 120 as having a bar shape. However, alternative shapes and configurations, as will be contemplated by those of ordinary skill in the art, may be employed. In particular, any configuration, which prevents the light pattern from excessively overlapping with the other forward position light so that the pattern satisfies the FARs, may be used.

Furthermore, in an alternative embodiment, the auxiliary overlap shield 120 may be operably connected to the reflectors 220, instead of being incorporated into the cut-off shield module 10. For example, the auxiliary overlap shield 120 may be connected to the top of the reflectors 220.

Referring back to FIG. 1, the cut-off shield module 10 may include a perimeter shield 130, which runs along at least a portion of the module's 10 perimeter. The perimeter shield 130 may be configured to provide angular cut-offs to the overall light pattern, which limit the amount of light overlapping with the rear position light on the aircraft. In particular, the perimeter shield 130 may be designed to cut-off the primary and secondary distributions of light from substantially overlapping with dihedral angle A. The perimeter shield 130 allows the pattern of light to fall within the FAR maximum intensity requirements for Areas A and B in the dihedral angle A.

Similar to the large and auxiliary overlap shields 110 and 120, the perimeter shield 130 may be designed using techniques well known in the art.

The configuration of the mounting module 20 and cut-off shield module 10, according to the particular exemplary embodiments described above and illustrated in FIGS. 1-3B, is advantageous because only three LEDs are required for producing a light pattern that satisfies the FARs for forward position lights. This allows the dimensions of the mounting module 20 and cut-off module 10 to be compatible with a plurality of different mounting platforms for existing forward position lights using incandescent or halogen lamps.

For example, the forward position light device 1 according to exemplary embodiments may be designed to fit within envelope and mounting configurations corresponding to one or more of the following aircraft: Cessna Citation X®, Gulfstream GIV®, Gulfstream GV®, and LearJet® 31A/60. Thus, in an exemplary embodiment, the forward position device 1 may be used to directly replace the existing incandescent/halogen forward position light in the above mounting platforms without retrofitting the device 1 or modifying the platforms.

In other exemplary embodiments, the forward position light device 1 may be configured so that only minor modifications or retrofitting is required to replace the incandescent/halogen forward position lights in a plurality of different platforms.

Referring to FIG. 1, the mounting module 20 may be fastened to an electronic heat sink module 30 during operation according to an exemplary embodiment. The electronic heat sink module 30 will also be referred to hereafter as a "base assembly module."

Figure 2B:
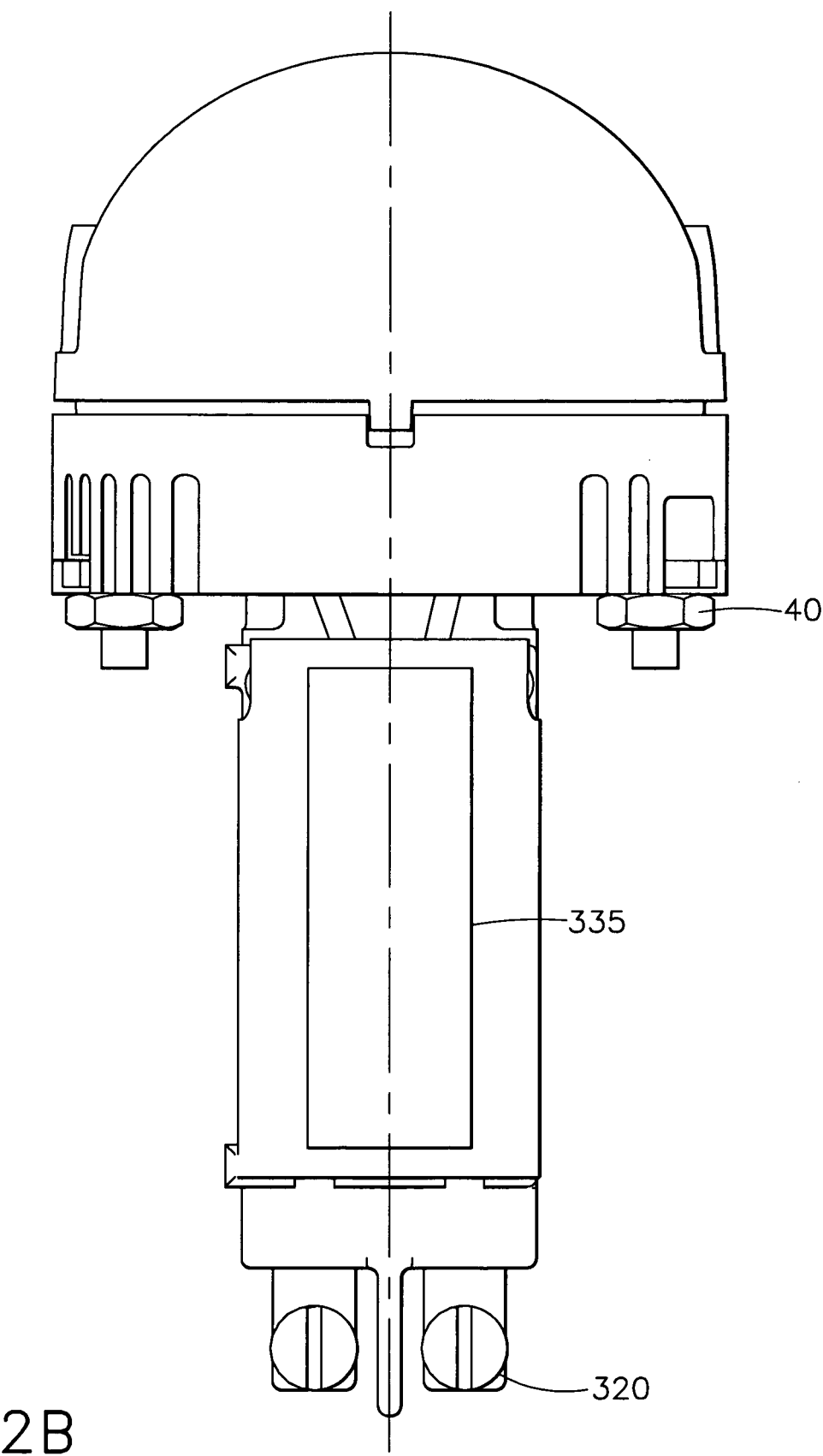

As shown in FIG. 1, the head of the base assembly module 30 includes a surface to which the cut-off shield module 10 and mounting module 20 are fastened. In an exemplary embodiment, the mechanism for fastening the base assembly module 30 to the cut-off shield and mounting modules 10 and 20 may comprise a pair of bolts and nuts 40, as illustrated in FIGS. 2A and 2B, that fit through a pair of corresponding holes in each of the head surface of the base assembly module 30, the mounting module 20, and the cut-off shield module 10.

In an exemplary embodiment, the wing of the aircraft may include a mounting assembly (not shown) with a pair of holes that correspond to the sets of bolts and nuts 40. Thus, the bolts and nuts 40 may be used not only to fasten the modules 10, 20, and 30 together, but also to fasten the forward position device 1 to the mounting assembly on the aircraft wing.

Of course, other types of fastening mechanisms (screws, etc.) may be used to secure the various modules 10, 20, and 30 together and to mount the forward position light device 1 to the aircraft wing, as will be readily contemplated by those of ordinary skill in the art.

The base assembly module 30 of FIG. 1 further includes an elongated body. The body of the base assembly module may include a heat sink 310. The heat sink 310 may provide enhanced heat dissipation for electronic circuitry (not shown) within the body of the base assembly module 30. As illustrated in FIGS. 1, 2A, and 3B, the body may comprise a casting, and the heat sink 310 may comprise cooling fins incorporated in this casting. (According to an exemplary embodiment, the head and body of the base assembly module 30 may be incorporated into the same casting.)

In FIG. 1, the base assembly module 30 also includes a cover 330 that may be fastened to the body using, e.g., a pair of screws. The cover 330 may be made of the same material from which the body is cast. Label 335 may be affixed to the cover 330.

In an exemplary embodiment, the base assembly module 30 includes electronic circuitry (not shown) that electrically connects the various solid-state light sources of the mounting module 20 (e.g., LEDs 210 and 230) to a power source of the aircraft. In particular, leads from the power source may connect to terminals 320 of the base assembly module 30. The terminals 320 may, in turn, operably connect to the electronic circuitry of the base assembly module 30.

According to an exemplary embodiment, the electronic circuitry may of the base assembly module 30 may include a passive type of circuitry. Passive circuitry may be sufficient a DC power source in the aircraft, which has a range of 18 to 32 volts, is available. This is especially true when the forward position light device 1 does not remain turned on for extended periods of time.

However, not all aircraft run on power sources ranging from 18-32 VDC. For example, some aircraft utilize AC power sources. Also, in commercial jets, the forward position lights may be in operation 24 hours a day. In such circumstances, it would be advantageous to use circuitry with active components to ensure that the current supplied to the LEDs 210 and 230 remains constant and within acceptable levels. An active components type circuit is also more efficient than passive circuitry and, thus, does generate excessive amounts of heat. Accordingly, active component electronics may be used to reduce the amount of heat to be dissipated.

Thus, in another exemplary embodiment, the electronic circuitry in the base assembly module 30 may be configured as a current control device for distributing a constant current to the solid-state light sources in the mounting module 20, despite fluctuations in the voltage of the power source. The various configurations of electronic circuitry, including both passive and active components, to implement such current control devices will be readily apparent to those of ordinary skill in the art.

According to an exemplary embodiment, the base assembly module 30 of the forward position light device 1 may be interchangeable with another base assembly module 30, which contains a different configuration of electronic circuitry.

For example, the forward position light device 1 may initially comprise a base assembly module with passive electronic circuitry. However, if it later becomes desirable to use an active current control device, one can update the electronic circuitry by replacing the base assembly module 30 with another module 30 containing the required circuitry.

Thus, the modularity of the forward position light device 1 allows for the cut-off shield module 10 and mounting module 20 to be retained when an electronic upgrade is performed. In other words, the upgrade may be accomplished by merely replacing the base assembly module 30 in the device 1.

It will also be readily apparent to those ordinarily skilled in the art that the modular nature of the forward position light device 1 may facilitate the manufacturing and assembly process, according to exemplary embodiments.

Furthermore, the use of castings to manufacture the various modules 10, 20, and 30 may simplify the manufacturing process. According to exemplary embodiments, a casting may be used to implement the cooling fins 240 and the surfaces of the primary and secondary LED modules in the mounting module 20. Similarly, the cut-off shield module 10 may comprise a casting incorporating the various cut-off shields in an exemplary embodiment. Similar castings may be used to manufacture the head surface and body of the base assembly module 30.

What is claimed is:

1. A forward position lighting device configured to be installed at a wing of an aircraft, the aircraft wing corresponding to a particular mounting platform, the device comprising:
   a plurality of modular components, including
      a mounting module having one or more solid-state light sources,
      a cut-off shield module that limits the light emitted by the solid-state light sources according to predetermined angular cut-off parameters, and
      a base assembly module including electronic circuitry that electrically connects the solid-state light sources to a power source within the aircraft; and
   a fastening mechanism configured to fasten the modular components together, the fastening mechanism being configured for repeated fastening and unfastening to facilitate the modularity of the modular components,
   wherein the modular components are configured so that the device is mountable within the wingtip of multiple types of aircraft via the fastening mechanism, and
   the electronic circuitry of the base assembly module is passive, the device being configured so that the base assembly module is interchangeable with a type of base assembly module whose electronic circuitry is active.

2. The device of claim 1, wherein the solid-state light sources are light-emitting diodes (LEDs), the LEDs being configured to emit at least one of aviation red and aviation green light.

3. The device of claim 2, wherein the fastening mechanism is configured to commonly fasten the mounting module to both the cut-off shield module and the wingtip.

4. The device of claim 1, wherein the mounting module includes a heat sink.

5. The device of claim 4, the mounting module comprising a casting, wherein the heat sink comprises cooling fins incorporated in the casting of the mounting module.

6. The device of claim 1, wherein the fastening mechanism is configured so that, by fastening the mounting module to the base assembly module, the fastening mechanism thereby fastens the device to the aircraft wing.

7. The device of claim 6, wherein the fastening mechanism includes at least one screw and corresponding clearance holes in the mounting module, base assembly module, and aircraft wing.

8. The device of claim 1,
   wherein
      the modular components are configured so that the device is mountable within the wingtip of multiple types of aircraft via the fastening mechanism, and
      the base assembly module includes a heat sink.

9. The device of claim 8, the base assembly module comprising a casting, wherein the heat sink comprises cooling fins incorporated in the casting of the base assembly module.

10. The device of claim 1, the mounting module having dimensions, which are compatible with each of the multiple types of aircraft, thereby allowing the device to be mounted to the mounting platform of the aircraft's wing without retrofitting the device or modifying the mounting platform.

11. A forward position lighting device utilizing light emitting diodes (LEDs), the device configured to be installed at a wing of an aircraft, the device comprising:
   a mounting module including:
      two side-emitting LEDs;
      one or more reflectors operable to reflect at least a portion of light emitted by the side-emitting LEDs, the side-emitting LEDs and reflectors being configured so that the light emitted by the side-emitting LEDs and the light reflected by the reflectors combine according to a first distribution of light; and
      a lambertian LED operable to emit light according to a second distribution of light,
   wherein the mounting module is configured so that the first and second distributions of light combine to form a pattern of light with a predetermined angular cutoff in the horizontal plane of the aircraft, and
   each side-emitting LED emits light around its optical axis such that radiant intensity peaks in the range of 60-100 degrees off the optical axis.

12. The device of claim 11, wherein a shape of the reflectors is determined based on light-emitting characteristics of the side-emitting LED to produce the first distribution of light.

13. The device of claim 12, wherein each of the reflectors corresponds to one of the side-emitting LEDs, each of the reflectors including a curved reflective surface whose curvature is determined based on the light-emitting characteristics of the corresponding side-emitting LED to produce the first distribution of light.

14. The device of claim 12, wherein the shape of the reflectors is compatible with the light-emitting characteristics of both side emitting LEDs that emit aviation red light, and side emitting LEDs that emit aviation green light.

15. The device of claim 11, wherein the dimensions of the device are compatible with multiple types of mounting platforms, thereby allowing the device to be mounted to each of the multiple types of mounting platform without retrofitting the device or modifying the mounting platform.

16. The device of claim 15, further comprising:
   a base assembly module including electronic circuitry that electrically connects the lambertian and side-emitting LEDs to a power source within the aircraft, the base assembly module being interchangeable with a base assembly module comprising different electronic circuitry.

17. Then device of claim 16, wherein at least one of the mounting module and the base assembly module comprises a casting that incorporates cooling fins, the cooling fins being operable as a heat sink.

18. A forward position lighting device utilizing light emitting diodes (LEDs), the device comprising:
   a mounting module including:
      first and second LEDs;
      one or more reflectors operable to reflect at least a portion of light emitted by the first and second LEDs, the first and second LEDs and reflectors being configured so that the light emitted by the first and second LEDs and the light reflected by the reflectors combine according to a first distribution of light; and a third LED operable to emit light according to a second distribution of light, the third LED being a lambertian LED, wherein the third LED is configured so that the first and second distributions of light combine to form a pattern of light; and a cut-off shield module operably connected to the mounting module, the cut-off shield module being configured to limit the pattern of light according to predetermined angular cut-off parameters.

19. The device of claim 18, wherein the cut-off shield module includes:

an overlap shield component configured to limit overlapping between the second distribution of light and another forward position light of the aircraft.

20. The device of claim 19, wherein the cutoff shield module includes:

an auxiliary overlap shield component configured to limit overlapping between the first distribution of light and the other forward position light of the aircraft.

21. The device of claim 20, wherein the overlap shield and auxiliary overlap shield components provide angular cutoffs to the first and second distributions of light that correspond to predetermined maximum intensity requirements.

22. The device of claim 20, wherein the cut-off shield module includes:

a perimeter shield component configured to limit overlapping between the pattern of light and a rear position light of the aircraft.

23. The device of claim 19, wherein an auxiliary overlap shield component is operably connected to the reflectors, the auxiliary shield component being configured to limit overlapping between the first distribution of light and the other forward position light of the aircraft.

24. The device of claim 19, wherein the dimensions of the mounting module and the cut-off module are compatible with each of a plurality of distinct mounting platforms, thereby allowing the device to be mounted to the distinct mounting platform without retrofitting the device or modifying the mounting platform.

* * * * *